(12) United States Patent
Kramarenko et al.

(10) Patent No.: US 11,834,239 B2
(45) Date of Patent: Dec. 5, 2023

(54) REUSABLE DISPENSER LID

(71) Applicant: PSIMOS, INC., New Canaan, CT (US)

(72) Inventors: Aleksei Valentinovich Kramarenko, Cheboksary (RU); Mikhaylov Dmitry Mikhaylovich, Moscow (RU); Gordeev Vladimir Vladimirovich, Moscow (RU); Stolyarov Alexander Dmitrevich, Moscow (RU); Paul Ostling, New Canaan, CT (US); Ilman Shazhaev, Dubai (AE)

(73) Assignee: PSIMOS, INC., New Canaan, CT (US)

( * ) Notice: Subject to any disclaimer, the term of this patent is extended or adjusted under 35 U.S.C. 154(b) by 153 days.

(21) Appl. No.: 17/191,779

(22) Filed: Mar. 4, 2021

(65) Prior Publication Data

US 2022/0281660 A1 Sep. 8, 2022

(51) Int. Cl.
  *B65D 51/28* (2006.01)
  *B65D 47/06* (2006.01)

(52) U.S. Cl.
  CPC ......... *B65D 51/2821* (2013.01); *B65D 47/06* (2013.01); *B65D 51/2835* (2013.01)

(58) Field of Classification Search
  CPC . B65D 51/2821; B65D 47/06; B65D 51/2835
  USPC .............................. 206/5, 219, 222; 215/227
  See application file for complete search history.

(56) References Cited

U.S. PATENT DOCUMENTS

| | | | | |
|---|---|---|---|---|
| 4,785,931 A * | 11/1988 | Weir | ................. | B65D 51/2835 206/508 |
| 5,934,493 A * | 8/1999 | Han | .................... | B65D 51/2835 206/568 |
| 6,152,296 A * | 11/2000 | Shih | ................... | B65D 51/2835 222/129 |
| 6,387,073 B1 * | 5/2002 | Weiler | ................. | B65D 1/0238 604/87 |
| 6,527,110 B2 * | 3/2003 | Moscovitz | ............... | B67B 7/26 215/DIG. 8 |
| 6,959,841 B2 * | 11/2005 | Vlodek | .................. | B65D 51/28 222/525 |
| 8,276,748 B2 * | 10/2012 | Nyambi | ............. | B65D 51/2835 215/257 |
| 9,004,302 B2 * | 4/2015 | Ginzburg | ................. | B65B 3/04 206/0.5 |
| 2007/0280042 A1 * | 12/2007 | Yamanaka | ......... | B65D 51/2835 366/185 |
| 2008/0290061 A1 * | 11/2008 | Seelhofer | ........... | B65D 51/2835 215/256 |

FOREIGN PATENT DOCUMENTS

| CN | 110002096 A | * | 7/2019 | |
|---|---|---|---|---|
| KR | 2009041267 A | * | 4/2009 | |
| WO | WO-2011098865 A1 | * | 8/2011 | ......... B65D 47/0804 |

* cited by examiner

*Primary Examiner* — James N Smalley
(74) *Attorney, Agent, or Firm* — Buckley, Maschoff & Talwalkar LLC

(57) ABSTRACT

Provided herein is reusable dispenser lid. The reusable dispenser lid can be removably fitted to the mouth of a container containing a fluid.

9 Claims, 6 Drawing Sheets

REUSABLE DISPENSER LID

BACKGROUND

Beverages are frequently sold or distributed using containers that will be referred to herein as "bottles". For example, many beverages are sold or distributed using single-use plastic water bottles. In the United States alone, in 2014, it has been estimated that over 100 billion plastic beverage bottles were sold. Of those, an estimated 57 billion were water bottles. There is increasing demand for reusable bottles which can be refilled with water or other beverages to reduce the amount of single-use plastic bottles.

There is increasing demand for beverages that are functional—such as sports drinks that are formulated to improve an athlete's performance and which have been mixed with substances such as carbohydrates, minerals or electrolytes. In addition to athletic performance improvements, functional beverages may be formulated to provide benefits such as improvement of heart health, immunity, digestion, or joint health. These beverages that are mixed or infused with biologically active substances will generally be referred to herein as "functional beverages." Many functional beverages are pre-mixed (e.g., they are sold and distributed in bottles in which the biologically active substance has already been mixed with liquid). Unfortunately, pre-mixing can lead to a reduction in the efficacy of many biologically active substances. For example, efficacy can be reduced due to the amount of time the mixed beverage sits in the bottle (which can vary based on supply chain and distribution issues), variations in temperature, exposure to ultraviolet light, or the like. In general, it is difficult to ensure that any biologically beneficial properties are not reduced or even substantially eliminated when functional beverages are pre-mixed.

Some functional beverages are mixed just prior to consumption by the user. For example, some manufacturers provide the biologically active substance in powder or other form shipped or distributed separately from the beverage in which the substance is to be mixed. The user is then responsible for measuring and mixing the substance with the liquid. Unfortunately, such an approach is inconvenient and potentially messy for the user. Further, a user may not mix the appropriate amount of substance with the appropriate amount of fluid which can further reduce the efficacy of the mixture. Even further, such powders are typically produced in bulk and are not customized for each individual user.

It would be desirable to provide improved systems, methods and apparatus that allow on-demand mixing and dispensing of functional beverages. It would further be desirable to support such on-demand mixing and dispensing of functional beverages in a way which reduces the use of single-use plastic bottles.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
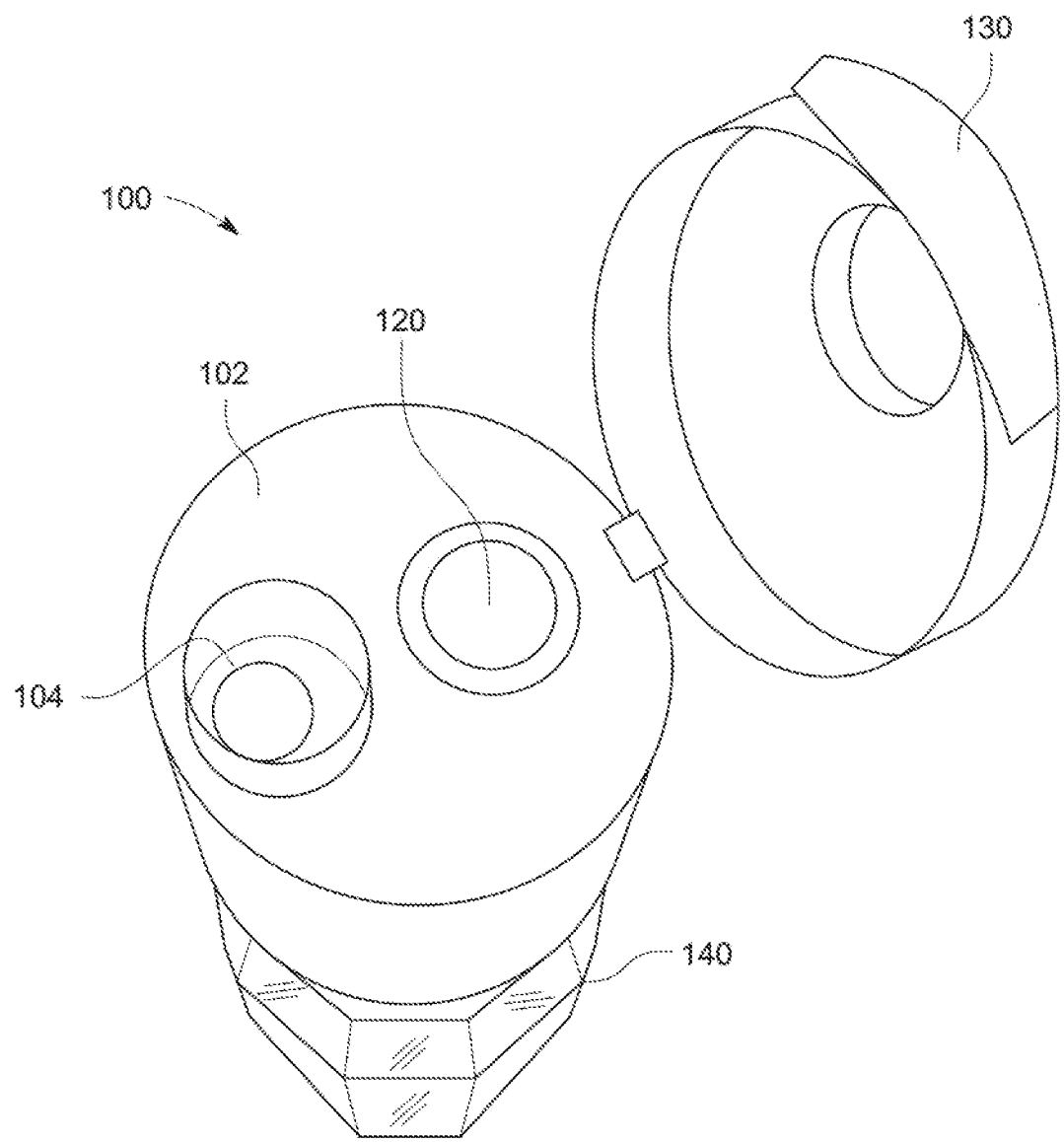
FIG. 1 is a perspective view of a reusable dispenser system pursuant to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Provided herein is reusable dispenser lid. The reusable dispenser lid can be removably fitted to a mouth of a container containing a fluid. Pursuant to some embodiments, the reusable dispenser lid is sized to fit the mouth of a typical wide-mouthed container such as a multi-use sports bottle. While other shapes and sizes of containers may also be used in conjunction with the present invention, for convenience and ease of exposition (and without limiting features of the present invention), to describe features of some embodiments, use in conjunction with a sports bottle will be described herein. The reusable dispenser lid has an opening to accommodate a removable cartridge which may hold a compound. Operation of a handle or depressing a button causes a compound to be dispensed from within the removable cartridge into a body of the container.

Features of some embodiments will now be described by first referring to FIG. 1 which is a perspective view of a reusable dispenser system 100 pursuant to some embodiments. In FIG. 1, the reusable dispenser system 100 is shown as including a reusable dispenser lid 102 installed on a neck of a container 140. The reusable dispenser system 100 includes, in some embodiments, a lid enclosure 130 mounted to the reusable dispenser lid 102 and movable between an open position (as shown in FIG. 1) and a closed position which conceals and protects elements of the reusable dispenser lid 102 and also seals an opening 104 so fluid from within the container 140 stays in the container 140. Those skilled in the art, upon reading the present disclosure, will appreciate that embodiments of the present invention may be used with a wide variety of types, shapes and sizes of container 140 as well as a wide variety of shapes and configuration of lids (such as, for example, lids with lid enclosures 130 as well as lids without lid enclosures).

The reusable dispenser lid 102 includes an opening 104 through which a user can drink or pour fluid from within the interior of the container 140. The reusable dispenser lid 102 also includes a cartridge 120 that is inserted into an opening of the reusable dispenser lid 102 and which may contain one or more compounds designed to be mixed with a fluid within the container 140 to achieve a desired functional beverage. In the embodiment depicted in FIG. 1, the cartridge 120 is shaped to include a button or compressible area (such as a bladder) that may be depressed by a user to discharge a compound from within the cartridge 120. In some embodiments, the top portion 124 of the cartridge 120 may be flexible and allow a user to depress the top portion 124, thereby compressing the compound and air in the interior of the cartridge 120. A bottom of the cartridge 120 may be covered with a thin film that may be broken when the top portion 124 is depressed, allowing the compound within the interior of the cartridge 120 to be dispensed into the interior 142 of the container 140 for mixing with the fluid therein.

Figure 2:
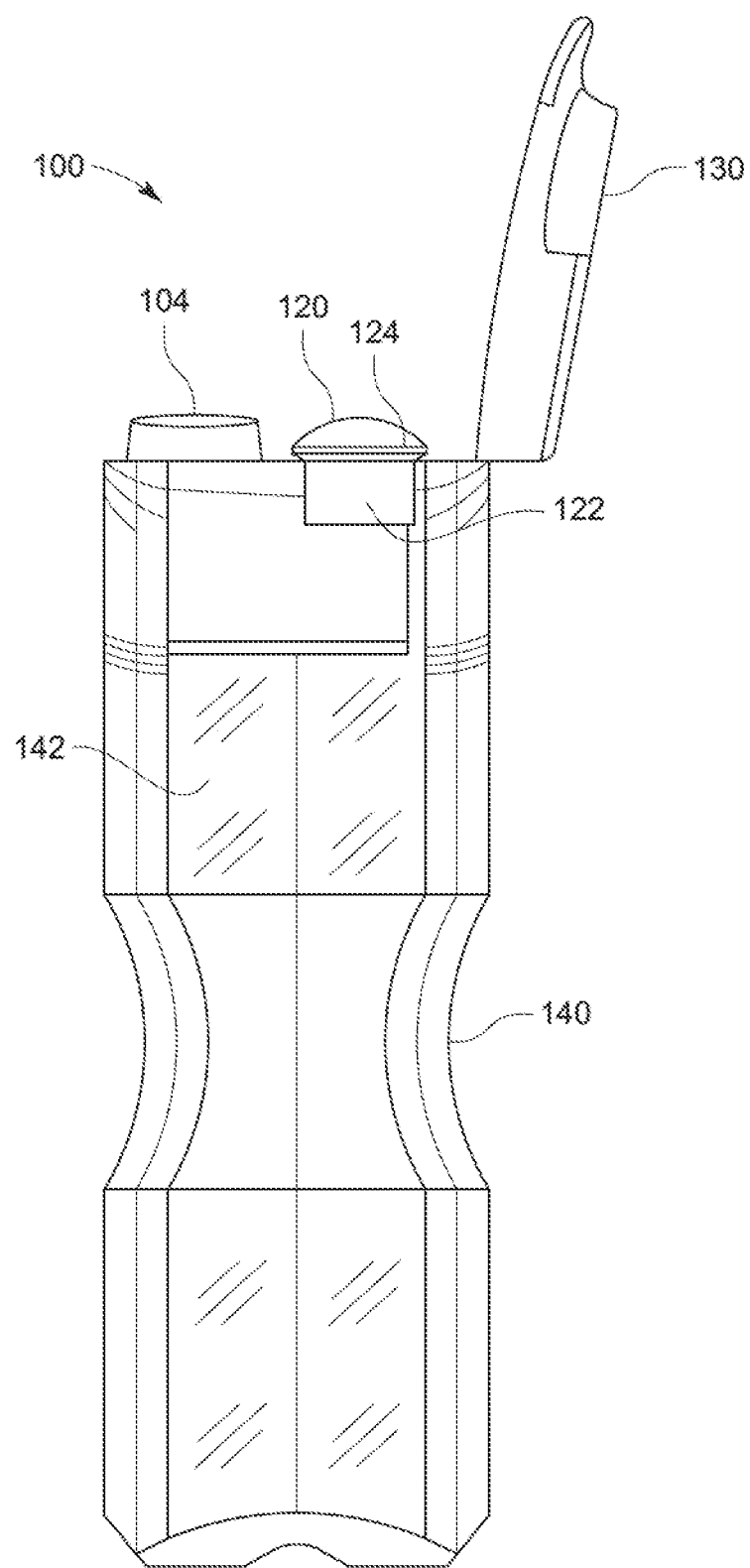
FIG. 2 is a partial cross section view of a reusable dispenser system pursuant to some embodiments.

Further features of the cartridge 120 may be seen in the partial cross-section view of the reusable dispenser system 100 shown in FIG. 2. As shown in FIG. 2, the cartridge 120 has a top portion 124 that acts as a button or compressible area. The cartridge 120 as a top portion 124 (which is accessible to a user on a top portion of the reusable dispenser lid 102) and a cartridge body 122 that has an interior to receive a compound (not shown in FIG. 2). The body 122 extends from the top portion 124 through the reusable dispenser lid 102 into an interior 142 of the container 140 such that any compound released from within the body 122 are released into the interior 142 of the container 140 for mixing with fluid therein (e.g., by shaking the container 140).

In some embodiments, the cartridge 120 may be reusable. For example, the cartridge 120 may be removed from the reusable dispenser lid 102 and the body 122 of the cartridge 120 may be refilled with a compound for further use. In some embodiments, the body 122 of the cartridge 120 may be sized and shaped to receive a capsule or a package containing one or more compounds therein. Each time the cartridge 120 is to be reused, a new capsule may be positioned within the body 122 of the cartridge 120.

Figure 3:
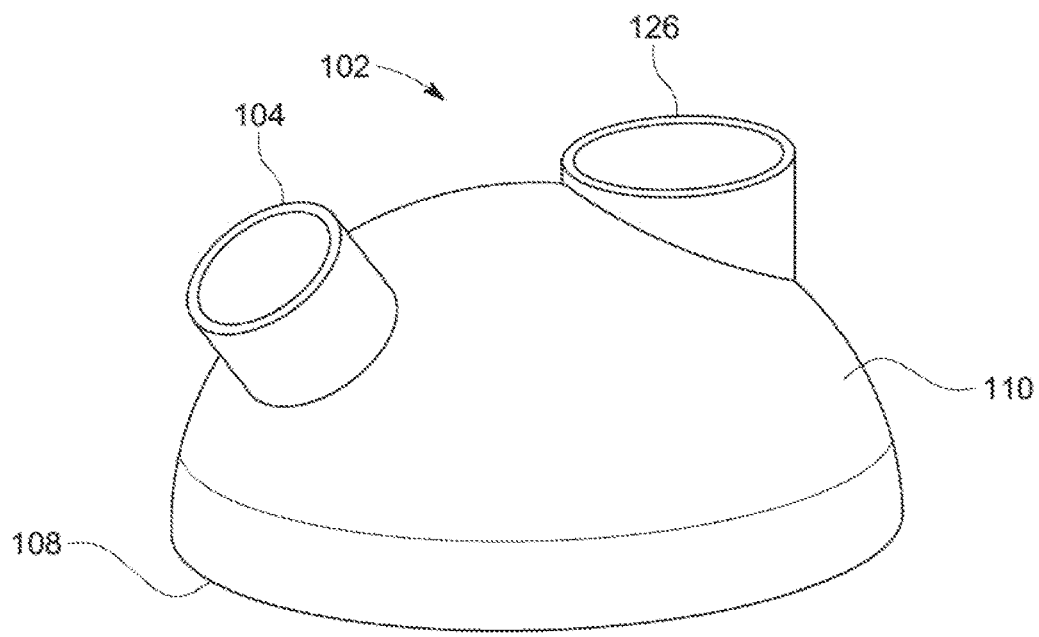
FIG. 3 is a perspective view of a reusable dispenser lid pursuant to some embodiments.

Reference is now made to FIG. 3 where a further embodiment of a reusable dispenser lid 102 is shown. In the embodiment depicted in FIG. 3, the reusable dispenser lid 102 has an opening 104 shaped to allow a user to drink therefrom. A cap, lid, nipple or other device may be attached to the opening 104 to allow a user to selectively open or close the opening 104 or to more easily access fluid through the opening 104. The reusable dispenser lid 102 also has a cartridge holder 126 or opening. The cartridge holder 126 is shaped and sized to allow a cartridge to be removably inserted therein. The reusable dispenser lid 102 is formed with a body 110 and an interior 108 shaped to fit on the neck of a container (not shown in FIG. 3). For example, the body 110 and interior 108 may have threads thereon which mate with corresponding threads of a container.

Figure 4:
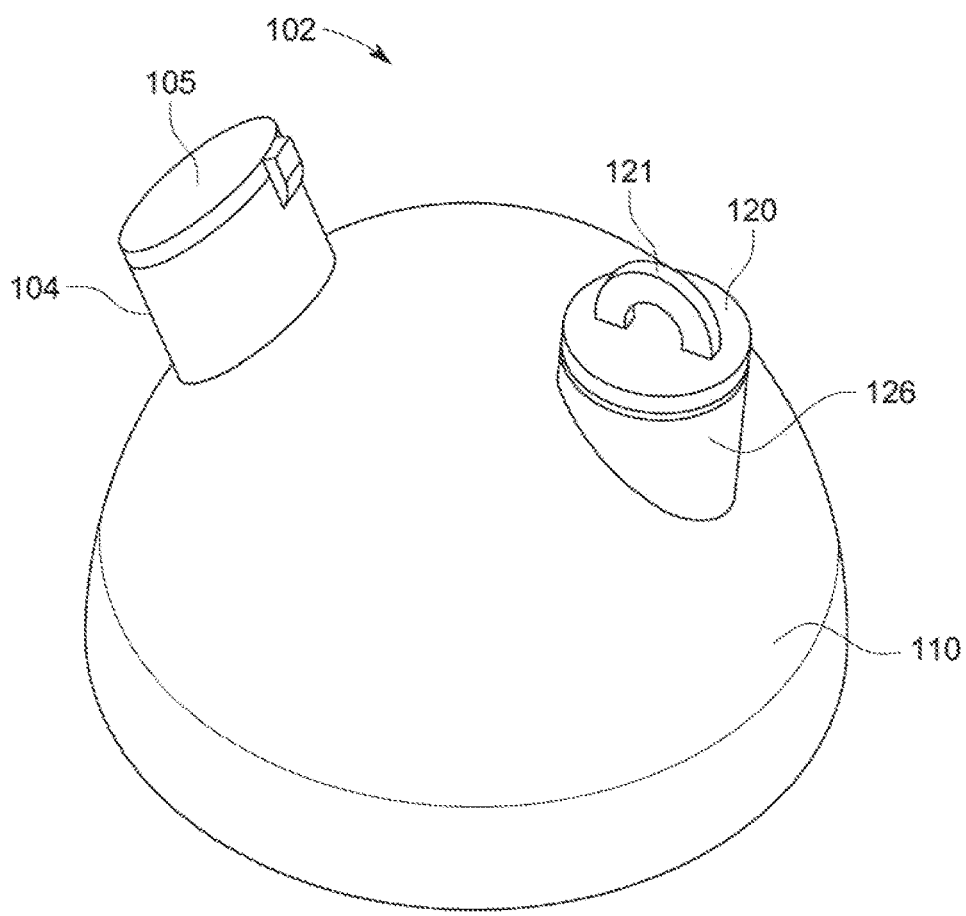
FIG. 4 is a further perspective view of a reusable dispenser lid pursuant to some embodiments.

Reference is now made to FIG. 4 where further details of the reusable dispenser lid 102 pursuant to some embodiments are shown. As depicted, the reusable dispenser lid 102 has an optional cap 105 installed on the opening. The reusable dispenser lid 102 also is shown with a cartridge 120 installed in the cartridge holder 126. The cartridge 120 shown is an embodiment in which the cartridge 120 has a handle 121 allowing a user to screw the cartridge 120 into and out of the cartridge holder 126. In some embodiments, when the cartridge 120 is screwed into the cartridge holder 126, the compound inside the body 122 of the cartridge 120 is released into the container.

Figure 5:
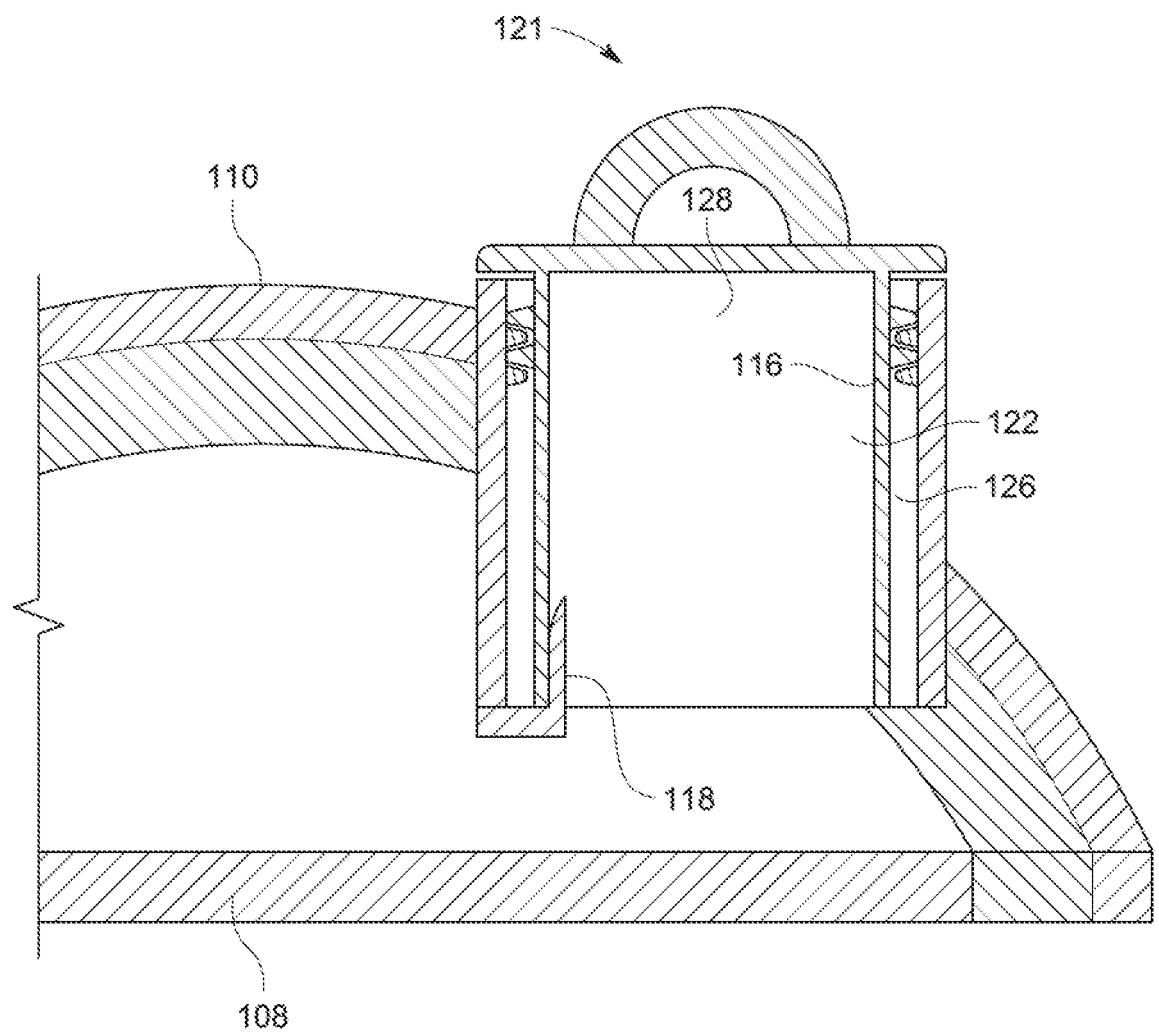
FIG. 5 is a partial cross section view of a reusable dispenser lid and a cartridge pursuant to some embodiments.

A partial side cross sectional view of the reusable dispenser lid 102 of FIG. 4 is shown in FIG. 5. As depicted, the cartridge 120 is shaped with a cylindrical body 122 and has threads 166 which mate with threads formed on an interior 128 of the cartridge holder 126. The cartridge interior 128 also has a flat blade 118 that extends into an interior of the cartridge holder 126 such that when a cartridge 120 is screwed into the holder 126, the blade 118 pierces a bottom of the cartridge body 122. In some embodiments, the cartridge body 122 is sealed using a thin film (not shown in FIG. 5). As the cartridge body 122 is screwed into the holder 126, the blade 118 pierces the thin film and the thin film is effectively opened as the cartridge body 122 is turned. Preferably, the threads 116 and the cartridge body 122 are sized such that the entire film is not removed from the body 122 by such action (thereby preventing the film from dropping into the interior of the container along with the compound). The blade 118 may be formed of a hard plastic or other material and shaped to allow the film to be pierced and cut as the cartridge body 122 is inserted into the cartridge holder 126.

Figure 6:
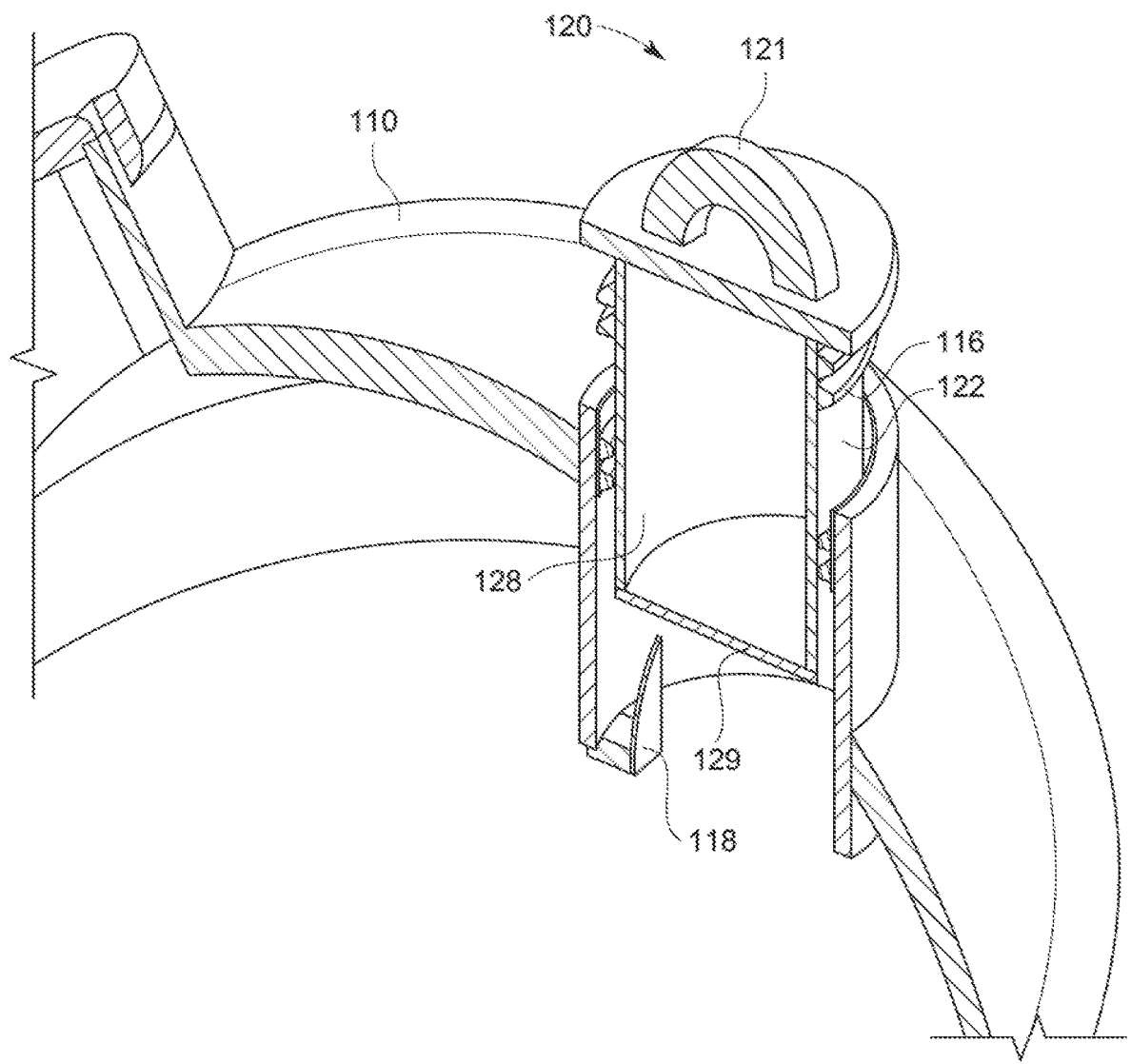
FIG. 6 is a further partial cross section view of a reusable dispenser lid and a cartridge pursuant to some embodiments.

A different partial cross sectional view of the reusable dispenser lid 102 of FIG. 4 is shown in FIG. 6. As depicted, the cartridge body 122 is being inserted into the cartridge holder 126. The cartridge body 122 has not bee inserted far enough for the film 129 to be engaged with the blade 118, and as a result, any compound that is enclosed within the cartridge interior 128 remains contained therein. In some embodiments, the cartridge body 122 may have a first position in which it is positioned within the cartridge holder 126 but not so far that the blade 118 has cut the film 129 (for example, at a first thread position) and a second position in which the cartridge body 122 is positioned further within the cartridge holder 126 such that the blade 118 has cut the film 129 (for example, at a second thread position). In this way, in some embodiments, the cartridge body 122 may be contained within the cartridge holder 126 until a user chooses to move the cartridge 120 to the second position to cause the compound to be dispensed into the container.

Preferably, the film material is sufficiently thin to allow the film to be punctured using the tip of the blade 118, yet thick enough to prevent the film from being unintentionally punctured during transit or storage. In some embodiments, the film material may be formed using one or more (or a combination of) materials such as: aluminum foil, paper, polyethylene (PE), polyvinyl chloride (PVC), polyvinyl nylon (OPA), polyethylene terephthalate (PET), ethylene vinyl alcohol (EVOH), polyamide (PA), fiberglass, rubber, silicone. Other suitable materials also could be used. In some embodiments, the cartridge 120 may be manufactured using food grade plastic materials that are sufficiently strong to withstand transportation and handling.

The interior 128 of the cartridge 120 may be filled (either partially or fully depending on a dosage) with a compound that is to be mixed with a fluid in a bottle to achieve a desired functional beverage. The compound may be any of a number of different compounds. For example, substances in various aggregate states and degrees of humidity can be placed in the cartridge 120. For example, the compound may be formed of powders or monodisperse or polydisperse systems (such as colloids, emulsions, suspensions or gels). In some embodiments, different color coding or other labeling conventions may be used to mark cartridges 120 so that users can easily identify which compound(s) are contained therein. Further, in some embodiments, different sizes of cartridges 120 (or capsules for placement inside a cartridge interior 128) may be provided for use with different sizes of bottles and fluid amounts. By sealing the compounds in the cartridge 120, embodiments improve the shelf life and efficacy of compounds for use in functional beverages.

Figure 7:
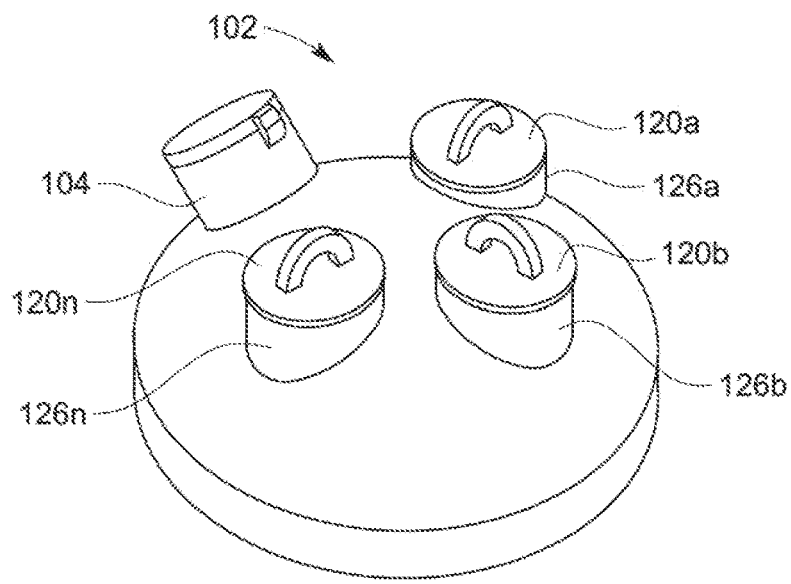
FIG. 7 is a further perspective view of a reusable dispenser lid pursuant to some embodiments.

Pursuant to some embodiments, different compounds may be mixed together to achieve different functional beverage performance benefits. For example, in some embodiments, dispenser lids may be provided with support for multiple cartridges. Referring to FIG. 7, a reusable dispenser lid 102 is shown that includes multiple cartridge holders 126a-n holding cartridges 120a-n. While three cartridge holders 126 are shown in FIG. 7, embodiments may be provided with two, three or even more cartridge holders 126 to allow the use of multiple cartridges 120 holding one or more compounds. For example, a user may wish to use multiple cartridges 120 having the same compound in order to increase a dosage of the compound. As another example, a user may wish to mix two or more compounds together in a container to achieve a desired functional beverage composition.

Figure 8:
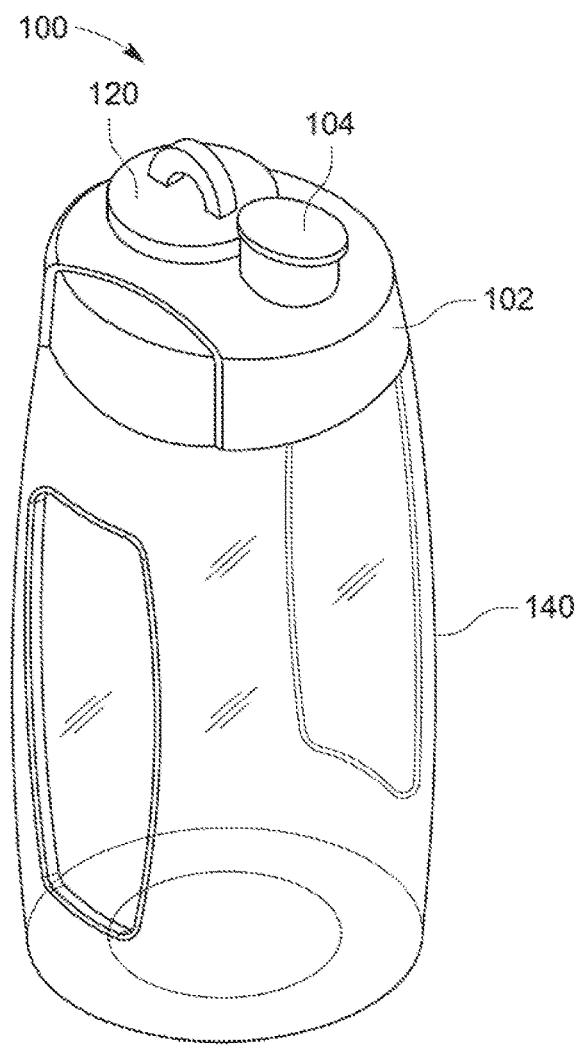
FIG. 8 is a perspective view of a reusable dispenser system pursuant to some embodiments.

Those skilled in the art, upon reading the present disclosure, will appreciate that different shapes and configurations of reusable dispenser lids 102 pursuant to the present invention may be provided. For example, referring to FIG. 8, a different style of a reusable dispenser lid 102 is shown that includes an opening 104 for accessing a liquid inside a container 140 that has a resealable cover associated with the opening 104. Other shapes and configurations of a lid may also be provided so long as the reusable dispenser lid 102 accommodates one or more replaceable cartridges as described herein.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A reusable dispenser lid, comprising:
    a body having a base and a cartridge holder, the base sized to mate with a neck of a container such that the body encloses the neck of the container, the body further comprising an opening, separate from the cartridge holder, allowing a user access to fluid from the container; and
    the cartridge holder having a plurality of threads removably holding a cartridge, the cartridge having a second plurality of threads that correspond to the plurality of threads of the cartridge holder, the cartridge further having an interior holding a compound, a top positioned above the body and a bottom formed of a film and positioned below the body and proximate the base, the cartridge holder further having a blade extending upward into the cartridge holder;
    wherein the compound is dispensed into the container when the cartridge is turned within the cartridge holder and the film is broken by the blade; and
    wherein the cartridge holder is integrally formed in the body.

2. The reusable dispenser lid of claim 1, wherein the top of the cartridge has a handle for turning the cartridge within the cartridge holder.

3. The reusable dispenser lid of claim 1, wherein the blade is positioned to cut the film when the cartridge is screwed into the cartridge holder such that the film does not detach from the cartridge.

4. The reusable dispenser lid of claim 1, wherein the body further comprises at least a second cartridge holder, the at least second cartridge holder removably receiving a second cartridge.

5. The reusable dispenser lid of claim 4, wherein the second cartridge holds a second compound.

6. A reusable dispenser system, comprising:
    a lid having a base, an opening, and a cartridge holder, the cartridge holder formed separately from the opening;
    the cartridge holder having a plurality of threads removably holding a cartridge, the cartridge having an interior holding a compound, a top positioned above the body and a bottom formed of a film and positioned below the body and proximate the base, the cartridge having a second plurality of threads that correspond to the threads of the cartridge holder and a handle formed on a top of the cartridge, the cartridge holder further having a blade extending upward into the cartridge holder; and
    a container, removably coupled to the base of the lid, the opening allowing a user access to fluid in the container when the container is coupled to the base of the lid;
    wherein the compound is dispensed into the container when the cartridge is turned by the handle when positioned within the cartridge holder and the film is broken by the blade.

7. The reusable dispenser system of claim 6, wherein the blade is positioned to puncture the film when the cartridge is screwed into the cartridge holder such that the film does not detach from the cartridge.

8. The reusable dispenser system of claim 6, wherein the blade is positioned to cut the film when the cartridge is screwed into the cartridge holder.

9. The reusable dispenser system of claim 6, wherein the lid further comprises an at least second cartridge holder removably receiving at least a second cartridge.

* * * * *